Figure 1:
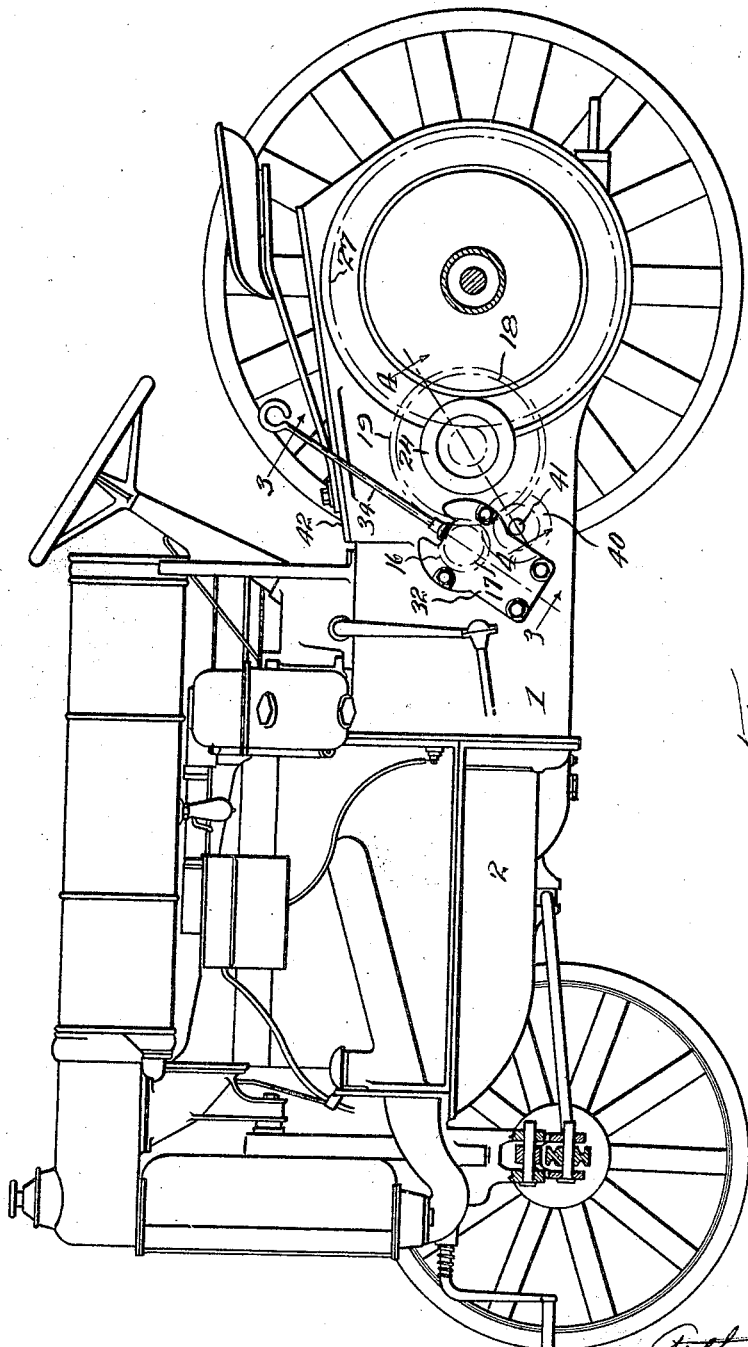

May 6, 1924.

A. P. ARMINGTON 1,492,623

TRACTOR TRANSMISSION UNIT

Filed Aug. 9, 1923

2 Sheets-Sheet 1

Inventor
Arthur P. Armington
By Hull, Brock & West
Attys.

May 6, 1924.
A. P. ARMINGTON
1,492,623
TRACTOR TRANSMISSION UNIT
Filed Aug. 9, 1923
2 Sheets-Sheet 2
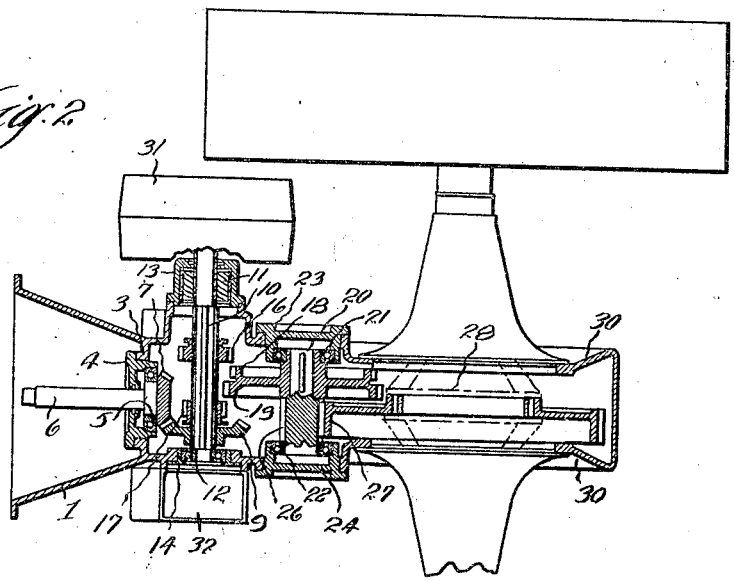
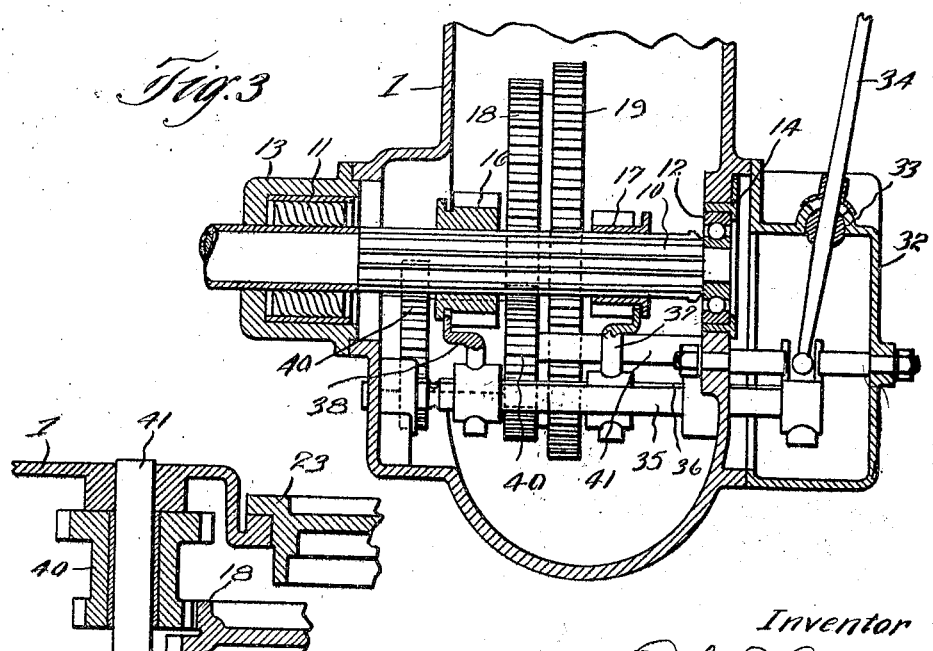

Patented May 6, 1924.

1,492,623

UNITED STATES PATENT OFFICE.

ARTHUR P. ARMINGTON, OF WILLOUGHBY, OHIO.

TRACTOR TRANSMISSION UNIT.

Application filed August 9, 1923. Serial No. 656,554.

*To all whom it may concern:*

Be it known that I, ARTHUR P. ARMINGTON, a citizen of the United States, residing at Willoughby, in the county of Lake and State of Ohio, have invented a certain new and useful Improvement in Tractor Transmission Units, of which the following is a full, clear, and exact description, reference being had to the accompanying drawings.

This invention relates to transmission units and while capable of general use, the present unit was designed particularly as a replacement for the transmission of a Fordson tractor.

The general object of the present invention is to provide a transmission unit which may be easily substituted for the present Fordson transmission unit, and when so substituted shall materially increase the draw bar pull of the tractor.

Another object is to provide a transmission unit of the aforesaid character which shall lengthen the wheelbase of the tractor and thereby overcome the tendency of the front wheels to leave the ground.

Another object is to provide a transmission unit which shall employ the same rear axle housings and other parts that are used at present in the Fordson tractor.

A still further object is to provide a transmission unit of the aforesaid character which shall be simple in construction, inexpensive to manufacture, and which shall be efficient in operation.

With these and other objects in view, the invention consists in the various novel features of construction and arrangement or combination, all of which will be fully described hereinafter and pointed out in the appended claims.

In the accompanying drawings wherein I have shown one form of my invention, Fig. 1 is a side elevation of a Fordson tractor equipped with my improved transmission, the front and rear axles being shown in section; Fig. 2 is a horizontal sectional view through the transmission unit; and Figs. 3 and 4 are detail sectional views taken on the line 3—3 and 4—4 respectively of Fig. 1.

Describing the various parts by reference characters 1 denotes the transmission housing which is fastened in the usual or any approved manner to the engine crank case 2. A partition 3 extends across the forward portion of the housing and receives a bearing cap 4 which supports a ball bearing assembly 5. Journalled within the ball bearing assembly is a drive shaft 6, one end of which is adapted to be connected to the engine crank shaft (not shown) while the opposite end thereof is fitted with a bevel drive pinion 7. This pinion meshes with a bevel gear 9 which is mounted on a transverse spline shaft 10, the latter being journalled in bearings 11 and 12 which are mounted in bearing caps 13 and 14 fastened to opposite sides of the transmission housing. Shaft 10 has splined thereon a pair of pinions 16 and 17, either of which is adapted to mesh respectively with integral intermediate gears 18 and 19. These gears are keyed to a transverse intermediate shaft 20 which is journalled in bearings 21 and 22 and these bearings are also carried by bearing caps 23 and 24 which are fastened to opposite sides of the transmission housing. Shaft 20 also mounts a drive pinion 26 which meshes with a ring gear 27 carried by the differential housing indicated at 28. Ring gear 27 is adapted to drive the rear axles and wheels through the differential housing and mechanism in the usual manner, and in practice I preferably use the same differential and rear axles and their housings that are used in the Fordson tractor.

In order that the usual Fordson rear axle housings and rear axles and associated parts may be used, I deflect inwardly the opposite side walls of the rear portion of the housing as shown at 30. This arrangement not only permits the use of the Fordson parts but also allows room for my improved transmission and materially increases the strength of the housing and associated elements.

As shown in Figs. 2 and 3, one end of spline shaft 10 is fitted with a suitable pulley 31 so that the tractor may be used as a stationary power plant, while adjacent the opposite end of said shaft the housing is fitted with a gear shift housing 32. This housing has mounted therein, by means of a ball joint 33, gear shift lever 34 which serves to shift the transmission gears to give the tractor two speeds forward and one reverse. As shown particularly in Fig. 3, two shaft rods 35 and 36 are mounted for longitudinal movement directly below the spline shaft 10, and these rods each mount a forked arm 37 and 38 respectively, which are engaged with their respective pinions 16 and 17. By moving the upper end of gear shift lever 34 toward the front of the tractor and thence to the right as viewed in Fig. 3, the lower end of said lever will slide rod 36 and arm 37 to the left thereby engaging pinion 17 with gear 19 to drive the tractor in low speed. By moving the upper end of gear shift lever 34 toward the rear of the tractor and thence to the left as viewed in Fig. 3, the lower end of said lever will slide rod 35, arm 38, and pinion 16 to the right and engage said pinion with gear 18 to drive the tractor in high speed. By moving the lever 34 so that rod 35, arm 38 and pinion 16 are moved to the left, said pinion will engage with an intermediate double pinion 40 which is journalled on a counter shaft 41. This double pinion is normally engaged with gear 18. It will thus be obvious, that by interposing the double pinion in the drive, the tractor rear wheels will be driven in a reverse direction.

Particular attention is called to the accessibility of all parts through the various bearing caps and also through a plate 42 normally closing the upper rear portion of the transmission housing.

The transmission unit may be easily substituted for the present Fordson unit by uncoupling the Fordson unit from the engine crank case, then coupling my transmission housing thereto and using the present Fordson rear axle housings and rear axle assembly. A Fordson tractor equipped with my improved unit will have the draw bar pull increased substantially fifty per cent with approximately the same gear ratio and engine speed.

Having thus described my invention, what I claim is:—

A replacement transmission unit for use with a Fordson tractor comprising a housing having one end thereof adapted to fasten to the engine crank case of a Fordson tractor, the opposite end of said housing being provided with opposed openings, the side walls of said housing defining said openings being deflected inwardly thereby to permit the standard Fordson rear axles and housings to be attached to said transmission housing and still maintain the same tread, spur gearing journaled within said housing and operatively connecting the engine crank shaft with the rear axles, and means for changing the ratio of gearing connecting said engine crank shaft with said rear axles.

In testimony whereof, I hereunto affix my signature.

ARTHUR P. ARMINGTON.